Patented Feb. 12, 1929.

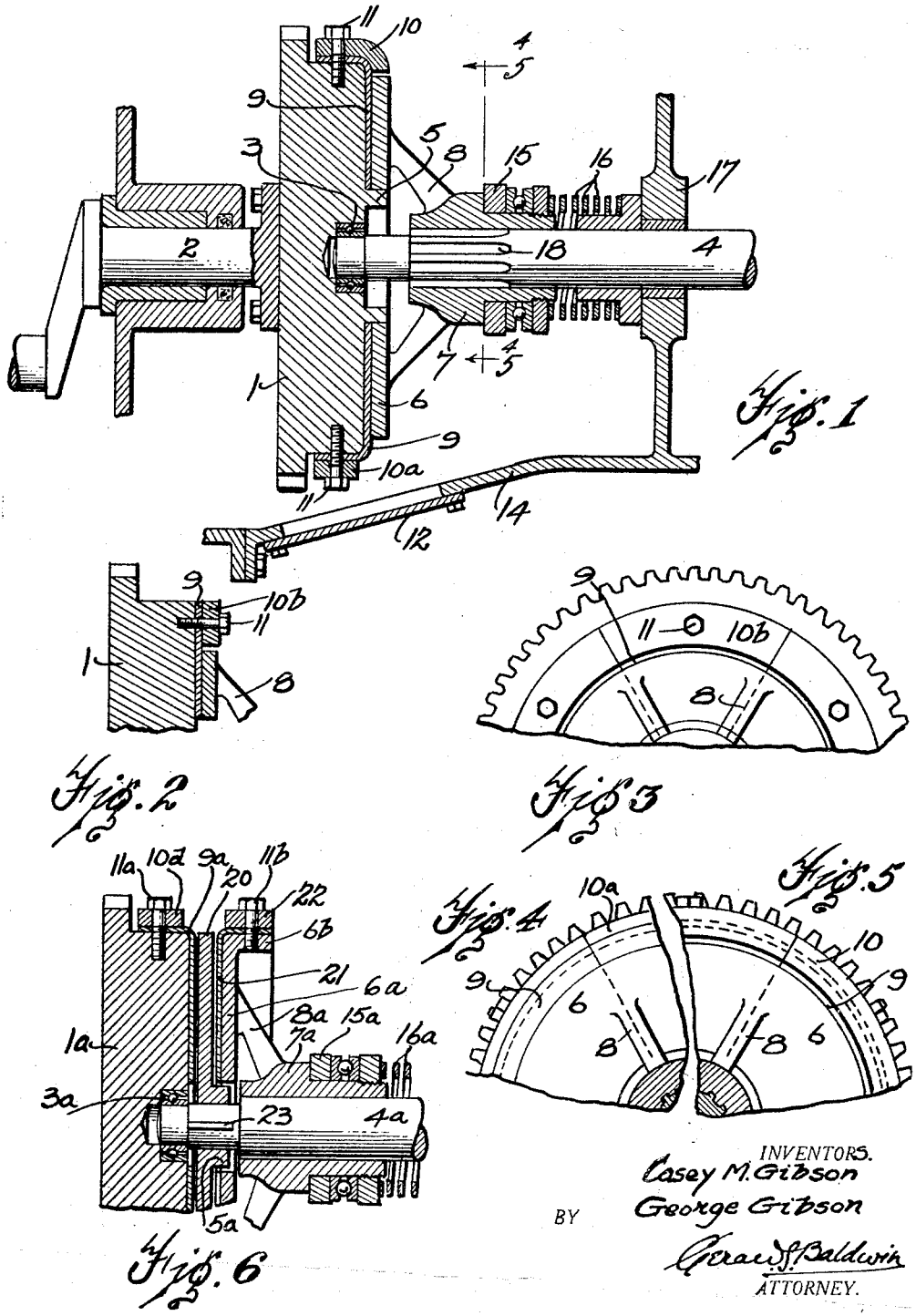

1,702,000

UNITED STATES PATENT OFFICE.

CASEY M. GIBSON AND GEORGE GIBSON, OF DETROIT, MICHIGAN.

CLUTCH-LINING ARRANGEMENT.

Application filed May 7, 1927. Serial No. 189,532.

This invention relates to improvements in clutch lining arrangements, and refers particularly to clutch linings employed between clutch pressure plates and fly wheels secured to crank shafts of automobiles.

It is an object of the invention to provide a clutch lining arrangement from which an old lining can be removed and another inserted without disturbing any other parts of the automobile mechanism.

Another object of the invention is to provide a clutch lining arrangement wherein a plurality of clamping plates secured around the fly wheel are employed to hold a series of linings in position against the face of the fly wheel on the side remote from the crank shaft, and with their radial margins substantially contiguous to one another.

A further object of the invention is to provide a clutch lining arrangement wherein a plurality of clamping plates are secured around the pressure plate to hold a series of linings against the face of the latter with their radial margins substantially contiguous to one another.

Yet another object of the invention is to provide a clutch lining arrangement wherein greater gripping area is provided in proportion to the diameter of the fly wheel.

With these and other objects in view, the invention is hereinafter more fully described with the aid of the accompanying drawings in which:

Figure 1 illustrates one preferred arrangement of the invention, and

Figure 2 is a partial view of a modified form of construction wherein the clamping plates are secured to the face of the fly wheel instead of to the periphery.

Figure 3 is a partial side view of Figure 2.

Figures 4 and 5 are sections on the line 4—4 and 5—5 of Figure 1 showing two forms of peripheral clamping plates.

Figure 6 is a view of the preferred construction when an intermediate plate is employed between the fly wheel and the pressure plate.

Referring more particularly to Figures 1 to 5 inclusive, 1 designates a fly wheel having a crank shaft 2 secured thereto, and a pilot bearing 3 therein to support one end of the transmission shaft 4. On the side of the fly wheel remote from the crank shaft an annular projection 5 is provided which forms a guide for the inner annular margin of the driven member, said member being formed in the present instance by a plate subjected to the action of a spring and being therefore termed a pressure plate 6. The latter is preferably integral with the sliding sleeve 7 and is usually attached thereto by a spider 8. On the face of the fly wheel are a plurality of sections of lining 9 arranged with their radial margins substantially in contact with one another. These linings are held in position by segmental clamping plates 10, $10^a$ or $10^b$ through which screws 11 pass that are in threaded egagement with the fly wheel.

It will be noted that the clamping plates 10 and $10^a$ shown in Figures 1, 4 and 5 are secured to the periphery of the fly wheel, whereas in Figures 2 and 3 the clamping plates $10^b$ are secured around the outer circumference of the face of the fly wheel.

The clamping plates 10 which also bear on the outer circumference of the fly wheel are employed with certain types of lining which require support where it is flexed around the fly wheel, whereas with other types of lining plain peripheral plates $10^a$ prove satisfactory. The clamping plates 10 and $10^a$ are usually preferable because they permit the whole face of the fly wheel being used as a bearing surface for the pressure plate, and again the screws 11 are more readily accessible when they take into the periphery of the wheel as they may be readily reached if a removable plate 12 is arranged on the underside of the bell housing 14.

In certain cases however it is not possible to arrange the clamping plates on the fly wheel periphery and in such cases the arrangement shown in Figures 2 and 3 is employed.

In Figure 1, 15 designates a conventional yoke by which the sleeve 7 is moved axially; 16 is the usual spring by which pressure is exerted on the plate 6 to force it against the fly wheel; 17 indicates one end of an ordinary transmission housing; and 18 the splined portion of the transmission shaft along which the sleeve 7 is axially movable. The spring 16 tends to hold the pressure plate 6 against the lining sections 9. When, however, the sliding sleeve is moved towards the transmission housing 17 by the yoke 15 the annular projection 5 continues to act as a guide for the pressure plate.

In Figure 6 a construction is shown wherein an intermediate plate 20 axially movable on the transmission shaft $4^a$ is arranged between the fly wheel $1^a$ and the pressure plate 6ª. One end of the transmission shaft 4ª is similarly mounted in a pilot bearing 3ª in one side of the fly wheel, and on the periphery of the latter clamping plates 10ᵈ, having screws 11ª through them which take into the periphery of the fly wheel 1ª, hold the outer margins of the lining sections 9ª which latter are arranged on the face of the fly wheel similarly to the lining sections 9. The pressure plate 6ª which is again connected to the sliding sleeve 7ª by a spider 8ª has a peripheral flange 6ᵇ thereon. On the face of this pressure plate adjacent to the intermediate plate 20 lining sections 21, similar to the lining sections 9 and 9ª, are arranged. These are held in position by clamping plates 22 similar to the clamping plates 10ª and 10ᵈ through which screws 11ᵇ pass which are in threaded engagement with the flange 6ᵇ.

In this construction the sliding sleeve 7ª is usually free on the shaft 4ª, and is engaged by a conventional yoke 15ª so that the pressure of the spring 16ª, which normally holds the pressure plate 6ª against the intermediate plate, and the latter in turn against the face of the fly wheel, may be offset. It will be noted that in this construction the lining sections 9ª and 21 each bear against one face of the intermediate plate which is splined as at 23 to the transmission shaft 4ª. The inner portion of the intermediate plate may have an annular projection 5ª thereon to form a guide for the annular pressure plate 6ª.

While in the foregoing the preferred constructions of the invention have been described and shown, it is understood that these constructions are subject to such modifications as fall within the scope of the appended claims.

What we claim as our invention and desire to secure by Letters Patent is:

1. In an arrangement of the character described the combination of a fly wheel, sections of lining on one face of said fly wheel, said sections being substantially contiguous to one another so as to form a ring against the fly wheel face, segmental clamping plates one over each lining section circumferentially coextensive therewith but outside the operative area of said sections, and fastening means passing through said clamping plates and said lining sections outside the operative area thereof and taking into said fly wheel.

2. In an arrangement of the character described the combination of a fly wheel, individually exchangeable sections of lining on one face of said fly wheel, said sections being substantially contiguous to one another so as to form a ring against said fly wheel, individually removable segmental clamping plates one over each lining section and circumferentially coextensive therewith, and fastening means holding said clamping plates in position.

3. In an arrangement of the character described the combination of a fly wheel, a pilot bearing therein, a transmission shaft one end of which is mounted in said pilot bearing, a sliding sleeve around said shaft, a pressure plate carried by said sleeve, a plurality of independently exchangeable lining sections on the face of said fly wheel, clamping plates each removably associated with and over said lining sections, and fastening means for holding said clamping plates on said fly wheel.

4. In an arrangement of the character described, the combination of a fly wheel, a pilot bearing in said fly wheel, a transmission shaft one end of which is supported in said pilot bearing, a sliding sleeve around said shaft, a pressure plate carried by said sleeve, a plurality of lining sections on the face of said pressure plate, clamping plates on said pressure plate to hold said lining sections in position, and fastening means for holding said clamping plates on said pressure plate.

5. A clutch lining arrangement, comprising in combination with a flywheel having a pilot bearing, a transmission shaft, one end of which is supported in said bearing, a pressure plate axially slidable on said transmission shaft, a plurality of linings on one face of the pressure plate, clamping segments on the pressure plate each associated with one of said linings, fastening means for holding said clamping segments in position on said pressure plate, an intermediary plate on the transmission shaft, and additional lining sections on the flywheel in opposition to said intermediate plate, and clamping segments individually associated with said second named lining sections, and means for securing said last named clamping plates to said flywheel lining sections.

6. A clutch lining arrangement, including a flywheel, independently removable sections of lining on one face of the flywheel, marginal portions of said sections being placed about the periphery of the flywheel, segmental clamping plates coextensive with the individual sections circumferentially and secured to the marginal portions of said sections which engage the peripheral portion of the flywheel, fastening means passing through the clamping plates and said marginal portions into the flywheel, and means for yieldingly forcing a driven member against the facial portions of said sections of lining.

7. A clutch lining arrangement, comprising a flywheel having a pilot bearing, a transmission shaft supported by said bearing, a pressure plate slidably carried by said shaft, a plurality of lining sections on the face of said pressure plate, and having portions engaging the periphery of said pressure plate, clamping plates associated with said lining sections and secured on the peripheral portions thereof which are in engagement with the peripheral portions of the pressure plate, fastening means for holding said clamping plates in position on the pressure plate, an intermediate plate slidably secured on said shaft between said pressure plate and said flywheel, lining sections on the flywheel in opposition to said intermediate plate, said lining sections having an operative area portion on the face of the flywheel and having an inoperative marginal portion in engagement with the periphery of the flywheel, and clamping plates on the flywheel in engagement with said marginal portions of the lining sections.

CASEY M. GIBSON.
GEORGE GIBSON.